(12) United States Patent
Johnson et al.

(10) Patent No.: US 7,182,029 B2
(45) Date of Patent: Feb. 27, 2007

(54) INDUCTOR ASSEMBLY FOR A PRODUCT CONVEYANCE SYSTEM

(75) Inventors: Chad M. Johnson, Arlington Heights, IL (US); Rodney S. Horn, Woodridge, IL (US)

(73) Assignee: CNH America LLC, Racine, WI (US)

( * ) Notice: Subject to any disclaimer, the term of this patent is extended or adjusted under 35 U.S.C. 154(b) by 337 days.

(21) Appl. No.: 10/926,233

(22) Filed: Aug. 25, 2004

(65) Prior Publication Data
US 2006/0042529 A1  Mar. 2, 2006

(51) Int. Cl.
*A01C 7/00* (2006.01)
*A01C 9/00* (2006.01)

(52) U.S. Cl. ........................................ 111/175

(58) Field of Classification Search ........ 111/174–185; 221/211
See application file for complete search history.

(56) References Cited

U.S. PATENT DOCUMENTS

| | | | |
|---|---|---|---|
| 3,490,654 A | 1/1970 | Fischer | |
| 3,656,661 A | 4/1972 | Schumacher et al. | |
| 3,730,395 A | 5/1973 | Gallogly et al. | |
| 4,493,273 A | 1/1985 | Gauchet et al. | |
| 5,156,102 A | 10/1992 | Andersen | |
| 6,192,813 B1 | 2/2001 | Memory et al. | |
| 6,253,693 B1 | 7/2001 | Mayerle et al. | |
| 6,289,830 B2 | 9/2001 | Mayerle et al. | |
| 6,298,797 B1 | 10/2001 | Mayerle et al. | |
| 6,644,225 B2 | 11/2003 | Keaton | |
| 6,668,738 B2 | 12/2003 | Lee et al. | |
| 6,688,244 B1 | 2/2004 | Meyer et al. | |
| 2003/0005867 A1 | 1/2003 | Richard | |
| 2003/0111000 A1 | 6/2003 | Hagen et al. | |

*Primary Examiner*—Christopher J. Novosad
(74) *Attorney, Agent, or Firm*—Rebecca Henkel (57) ABSTRACT

An inductor assembly includes an inlet configured to receive a forced air stream in a path to engage a flow of product so as to generate a combined stream of forced air and product for conveyance to a remote receiver or planting unit for application in an agricultural field. A series of inductor segments each defines a first and a second conduit to communicate the combined stream of forced air and product from the inductor housing to the remote receiver for application in a field. Each first and second conduit includes a bypass opening located to receive a bypass portion of the forced air stream in a manner that enhances the flow of the combined stream of forced air and product to the remote receiver. A vane is located to enhance guidance of the forced air stream in a path toward the mass of product received in the inductor housing.

17 Claims, 6 Drawing Sheets

INDUCTOR ASSEMBLY FOR A PRODUCT CONVEYANCE SYSTEM

FIELD OF THE INVENTION

The invention relates to a product conveyance system for conveying product in an agricultural environment and, more particularly, relates to a planting implement with an improved inductor assembly for conveying seed and other particulate material to a planting unit for application in an agricultural environment.

BACKGROUND OF THE INVENTION

In recent years, agricultural implements have employed forced air conveyance systems to deliver seed, fertilizer and herbicides. As the size of these agricultural implements continues to grow, the versatility of such implements becomes more significant. In particular, large air carts or air seeders have become increasingly popular for conveying seed, fertilizer and other product without strict regard for the exact placement of the product. Typically, these large air carts are used for dry land farming (e.g., cereal crops, etc.).

For certain crop planting applications that require row crop planting or seed singulation (e.g., corn, soybean, etc.), the air cart can be combined with an inductor assembly adapted to feed seed or other product from a larger storage hopper into smaller reservoirs located at on-row planting units, also referred to as singulators or receivers. The combined air cart and inductor assembly enables a farmer to singulate planting of seeds on-row from one central hopper filling location. Thereby, the nurse inductor assembly and air cart allows a farmer to plant more acreage before having to stop to fill the central hopper again, resulting in quicker planting and less labor while maintaining the precision spacing available by on-row singulation.

U.S. Pat. No. 6,253,693 discloses a nurse inductor assembly in flow communication with a storage hopper of seed mounted on an air cart. The air cart includes a fan to provide a forced air stream through the inductor assembly. The forced air stream is directed by the inductor assembly to a general location of a seed mass delivered from the storage hopper. The forced air stream engages the seed mass, entraining the seed into the air stream. A moveable seed control gate is configured to regulate an angle of repose of a surface of the seed mass, which affects the entrainment of the seed into the forced air stream. The inductor assembly conveys the combined stream of forced air and seed through a series of inductor sections that each leads to an isolated inductor distribution tube and ultimately to a distribution line leading to associated series of remote receivers for application of the seed in an agricultural field. When the receiver is full of seed, the air stream is restricted from escaping the receiver and ultimately reduces the capacity of the air stream at the inductor assembly to induce the seed into the inductor distribution tubes.

The certain known nurse inductor assembly described above has several drawbacks. For example, the velocity of the combined stream of air and seed product through the distribution line slows as the stream encounters the increased resistance associated with traveling through the deposited seed product at the receiver. If allowed to be induced into the distribution lines below the minimum carrying velocity, the seed product causes blocking of the seed distribution lines. Any seed product that had been entrained into the slower flowing air stream drops out under the force of gravity. A certain quantity of dropped seed product will deposit toward low points in the distribution lines, increasing plugging opportunities. Another drawback of the certain known nurse inductor assembly is that the movable gate is difficult to adjust for various products of different sizes and properties, which can cause uneven product flow to the receivers and/or plugging opportunities in the inductor assembly or distribution lines. Also, the interference of the seed control gate to the flow of the combined stream of air and seed will cause the seed to bridge across the inductor chamber of the inductor apparatus and inhibit the entrainment of seed into the forced air stream.

A need has thus arisen to provide an improved inductor assembly and an improved method of forced air conveyance of product that provides sufficient carrying capacity to convey seed through a distribution line to a remotely located receiver. The need has also arisen to provide an improved inductor assembly that enhances uniformity of the combined stream of air and product across the inductor assembly and into the distribution lines. The need has also arisen to provide an improved method of forced air conveyance of product that reduces plugging opportunities associated with bridging across the inductor chamber of the inductor assembly. The need has also arisen to provide an improved method of forced air conveyance of product that enhances entrainment of the product in the air stream. The need therefore has arisen to provide a simple, reliable, durable, and efficient system for a forced-air conveyance of product in an agricultural setting or environment.

SUMMARY OF THE INVENTION

The present invention provides an inductor assembly configured to be attached in flow communication to receive a flow of product from a storage hopper of a product conveyance system. The product conveyance system further includes a forced fluid source mounted thereon and operable to provide a forced fluid stream to the inductor assembly. The inductor assembly includes an inductor housing configured to receive a flow of product from the storage hopper. The inductor housing includes an inlet configured to direct a first portion of the forced fluid stream in a path to engage the flow of product so as to generate the combined stream of forced fluid and product. The inductor assembly further includes at least one inductor segment that defines at least one conduit having an inlet and an outlet. The inlet of the at least one conduit is located to receive the combined stream of forced fluid and product. The at least one inductor segment further includes a bypass opening disposed between the inlet and the outlet of the at least one conduit. The bypass opening is located in general alignment to receive a second portion of the forced fluid stream through the inlet of the inductor housing. The second portion of the forced fluid stream is combined with the combined stream of forced fluid and product for conveyance from the outlet of the inductor segment. The number of inductor segments can vary. The preferred inductor assembly can further include a vane located between the inductor housing inlet and the inlet of the conduit. The vane is disposed at an angle to guide the forced air stream in a path toward the product delivered from the storage hopper into the inductor housing.

The preferred inductor segment defines a first conduit and a second conduit, the first conduit having a first inlet and a first outlet and a first bypass opening located therebetween, and the second conduit having a second inlet and a second outlet and a second bypass opening located therebetween. The second outlet of the second conduit is stacked above the first outlet of the first conduit, and in a like manner, the second bypass opening of the second conduit is generally stacked above the first bypass opening of the first conduit. The first bypass opening is in general horizontal alignment with the first outlet of the first conduit, and the second bypass opening is in general horizontal alignment with the second outlet of the second conduit. The preferred inductor segment further includes a first vertical wall and a second vertical wall that defines the first inlet. The first and second vertical walls are generally linear-shaped or convex-shaped in a direction toward the product delivered from the storage hopper. This configuration enhances sustenance of the carrying velocity of the forced fluid stream before the combined stream of forced fluid and product is conveyed from the conduit outlet to a distribution line for conveyance to a remote location, e.g., singulator planting unit.

The present invention also provides an inductor assembly for conveyance of a product in a storage hopper of a planting implement for application in an agricultural field. The planting implement includes a forced fluid source operable to provide a forced fluid stream. The inductor assembly includes an inductor housing configured to receive the flow of product from the storage hopper. The inductor housing includes an inlet to direct the forced fluid stream in a direction toward the flow of product so as to generate the combined stream of forced fluid and product. The inductor assembly further includes at least one inductor segment that defines at least one conduit in flow communication to receive the combined stream of forced fluid and product generated in the inductor housing. The inductor assembly also includes a vane located between the inductor housing inlet and the at least one inductor segment. The vane is disposed at an angle and to direct the forced fluid stream toward the product received from the storage hopper into the inductor housing. The preferred vane defines a gap with the inductor segment to direct the stream of forced fluid or air through. The vane is mounted on a removable panel.

The present invention also provides a product conveyance system configured to distribute a supply of product in an agricultural environment. The product conveyance system includes a hopper configured to contain the supply of product, a forced air source operable to provide a stream of force air, a distribution system, and an inductor assembly. The distribution system is configured to convey a combined stream of product and forced air to a planting unit for application of the product in the agricultural environment. The inductor assembly is configured to generate the combined stream of forced air and product. The inductor assembly includes an inductor housing configured to receive a flow of product from the storage hopper. The inductor housing includes an inlet configured to direct a first portion of the forced air stream in a path to engage the flow of product delivered from the storage hopper in such a manner as to generate the combined stream of forced fluid and product. The inductor assembly further includes at least one inductor segment that defines at least one conduit having an inlet and an outlet. The inlet of the conduit is located in flow communication to receive the combined stream of forced fluid and product. The at least one conduit further includes a bypass opening disposed between the inlet and the outlet and located in general alignment to receive a second portion of the forced fluid stream through the inductor housing inlet.

Furthermore, the present invention provides a method of conveying a product using a stream of forced air to a remote location. The method includes the steps of receiving a forced air stream into an inlet of the inductor housing; guiding a first portion of the forced air stream in a path to engage a mass of product in the inductor housing in such a manner as to generate a combined stream of product and forced air; receiving the combined stream of forced air and product into an inlet of an inductor segment disposed inside the inductor housing; receiving a second portion of the forced air stream into the inductor segment at a location downstream of the inlet of the inductor segment; and combining the second portion of the forced air stream with the combined stream of product and forced air for discharge from an outlet of the inductor segment. The preferred receiving step includes conveying the second portion of the forced air stream through a bypass opening located between the inlet of the inductor segment and the outlet of the segment. The preferred guiding step includes funneling the forced air stream between a vane and the inductor segment.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 1 schematically illustrates a side elevation view of an air cart in combination with the inductor assembly in accordance with the present invention.

FIG. 2 schematically illustrates a front view of a planter associated with the air cart and inductor assembly of FIG. 1.

FIG. 3 schematically illustrates an isometric view of the inductor assembly shown in FIG. 1.

FIG. 4 schematically illustrates a detailed cross-sectional view of the inductor assembly along line 4—4 in FIG. 3 in combination with the storage hopper.

FIG. 5 schematically illustrates an interior view of the inductor assembly shown in FIG. 3, with a portion of the inductor housing removed;

FIG. 6 schematically illustrates a detailed forward view of an inductor segment of the inductor assembly shown in FIG. 4.

DETAILED DESCRIPTION OF THE PREFERRED EMBODIMENTS

A wide variety of inductor assemblies for conveying product with forced fluid, e.g., air, could be constructed in accordance with the invention defined by the claims. Hence, while preferred embodiments of the invention will now be described with reference to a product conveyed by an air cart, it should be understood that the invention is in no way so limited. The type of conveyance system or machine (e.g., air seeder, row-crop planter, spreader, etc.) can vary. The description generally refers to use of the present invention to convey product, and the invention can be utilized to convey a wide variety of product (e.g., seed, fertilizer, herbicide, pesticide, etc.) and is not limiting on the invention. In addition, the type and size of the product (e.g., soybean, corn, cereal grains, fertilizer, herbicide, etc.) can vary.

1. Planter Overview

FIG. 1 illustrates an inductor assembly 100 of a product conveyance system in accordance with present invention configured to be pulled by a tow vehicle (not shown) in a forward direction of travel (illustrated by arrow 102). The exemplary embodiment of the product conveyance system is a planting implement that includes a conventional air cart 105 in combination with a planter 107. The air cart 105 generally includes a main or central storage hopper 110, and a pressurized or forced air source 115. The forced air source 115 (e.g., blower fan, etc.) is operable to provide a stream of pressurized air (illustrated by arrow 116) to the inductor assembly 100. Although the inductor assembly 100 is illustrated in combination with an air cart 105 and a planter 107, it is understood that the type and configuration of the planting implement can vary. For example, the inductor assembly 100 can be mounted with the forced air source 115 on the planter 107.

Figure 1:
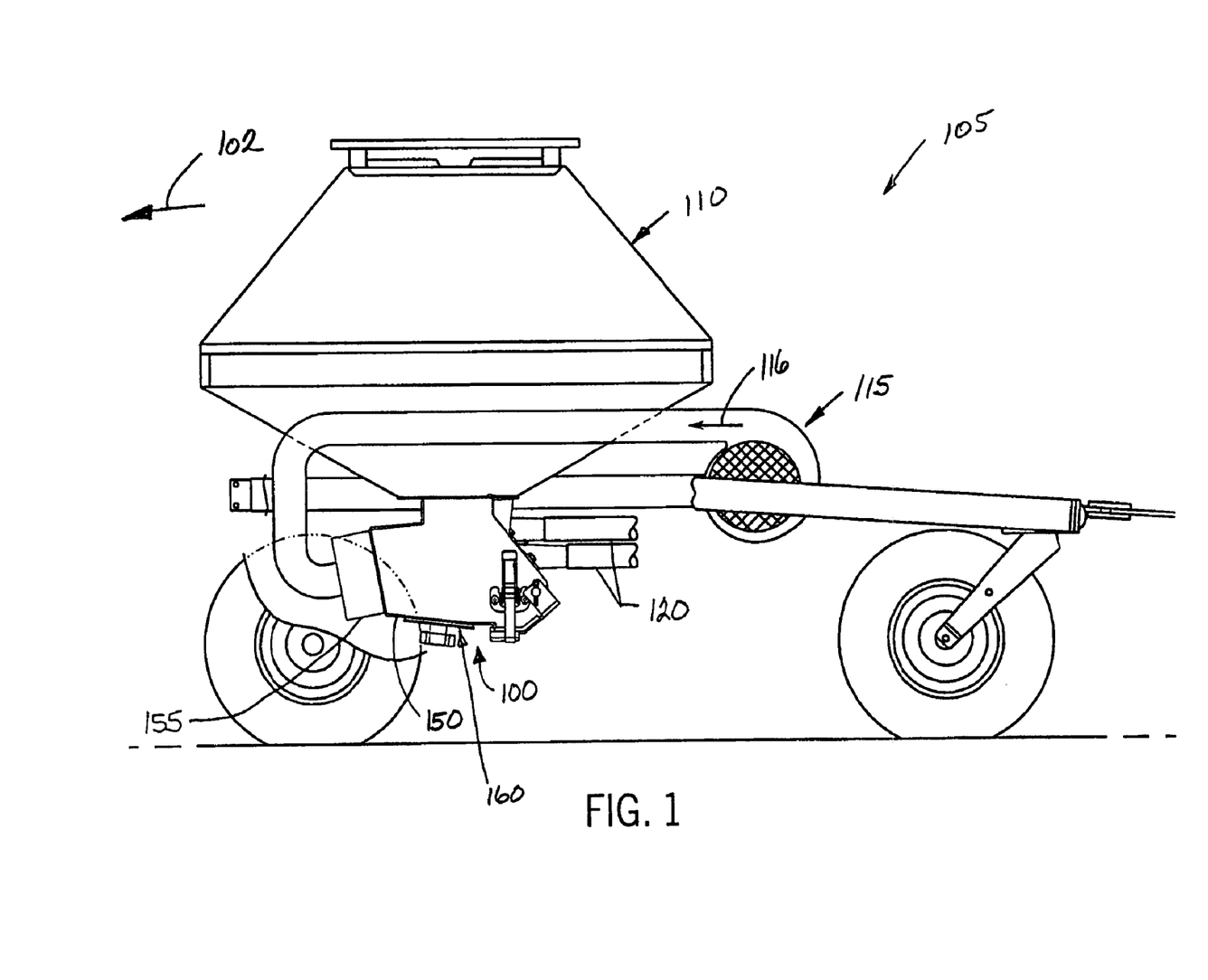

Still referring to FIG. 1, the inductor assembly 100 is generally configured to direct or guide the stream of forced air (shown by arrow 116) provided from the forced air source 115 into a path that engages the product fed from the storage hopper 110. The forced air stream conveyed from the forced air source 115 into to the inductor assembly 100 pressurizes the inductor assembly 100, as well as agitates the product accumulating in the inductor assembly 100. The turbulence of the forced air stream agitates the accumulation of the product, separating and entraining the product into the air stream.

Figure 2:
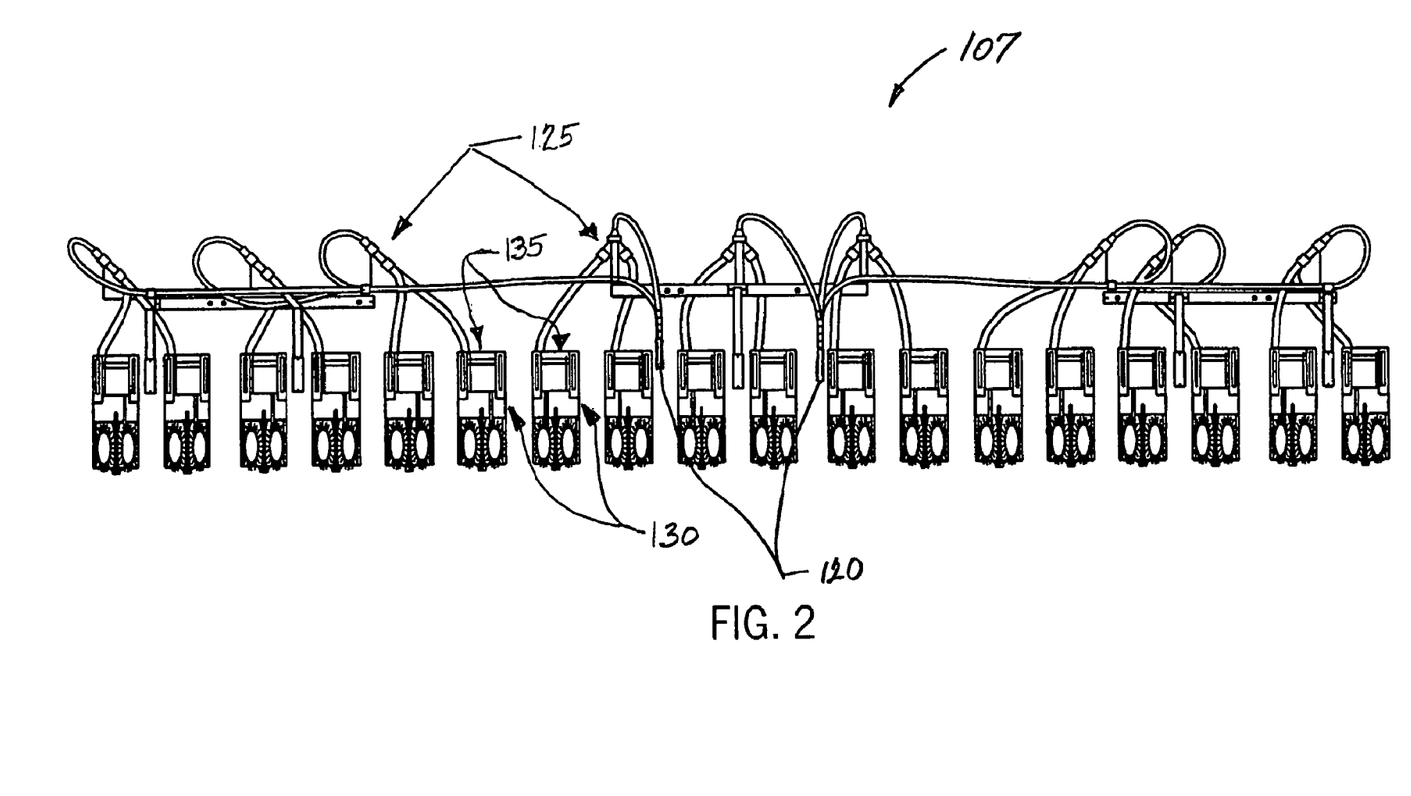
Figure 4:
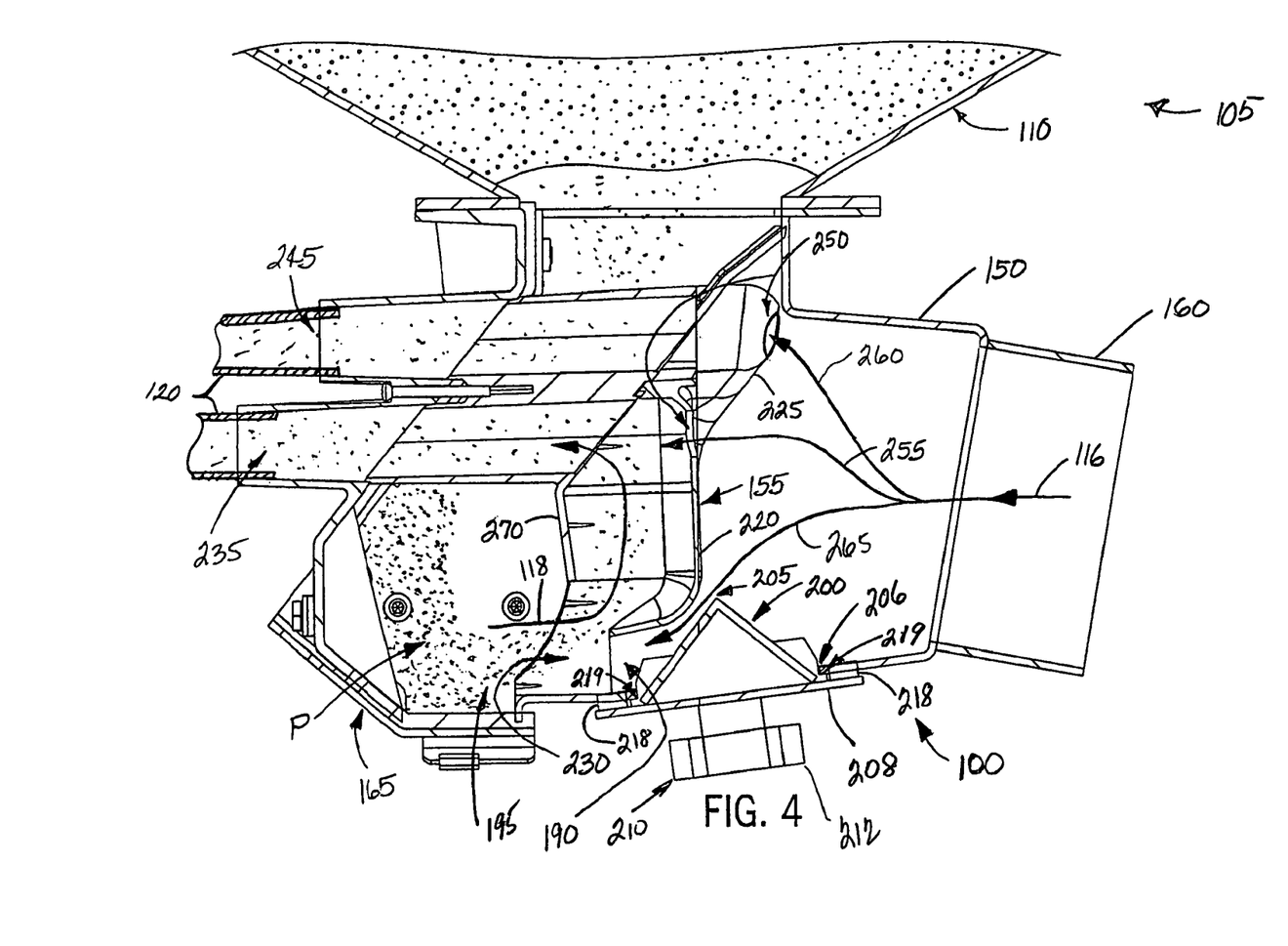

Referring to FIGS. 1, 2, and 4, the forced air stream also creates a vacuum in the inductor assembly 100 such that the combined stream of forced air and entrained product shown by arrow 118 is swept toward and into one or more distribution lines 120 that lead to the planter 107 (FIG. 2). The planter 107 includes a distribution or receiver header 125 in communication with one or more planting units 130 (See FIG. 2). The planting unit 130 generally includes a receiver or mini-hopper 135. The individual seed product remains suspended or entrained in the air stream while passing through the receiver header 125 to the planting unit 130. In another embodiment of the planter 107, the combined stream of forced air and entrained product may pass from the one or more distribution lines 120 directly to one or more planting units 130. In a known manner, the air bleeds off through an air vent (not shown) at the planting unit 130, and the entrained individual seed product falls by gravity into a second pile or mass at the receiver or mini hopper 135. The planting unit 130 is thereafter operable to singulate the product for application into a furrow in the ground.

Although the illustrated inductor assembly 100 is shown mounted on the air cart 105, the inductor assembly 100, the hopper 110, and/or the forced air source or combination thereof can be mounted on the planter 107 and is not limiting on the invention.

2. Inductor Assembly

FIGS. 3–6 illustrate a detailed view of a first embodiment of the inductor assembly 100 of the present invention. At the inductor assembly 100, the product is suspended and carried away by the forced air stream only when the velocity of the forced air stream is above the minimum carrying velocity to entrain the product in the air. A forced air stream velocity below the minimum carrying velocity will allow gravity to deposit or remove the product from the air stream.

Figure 3:
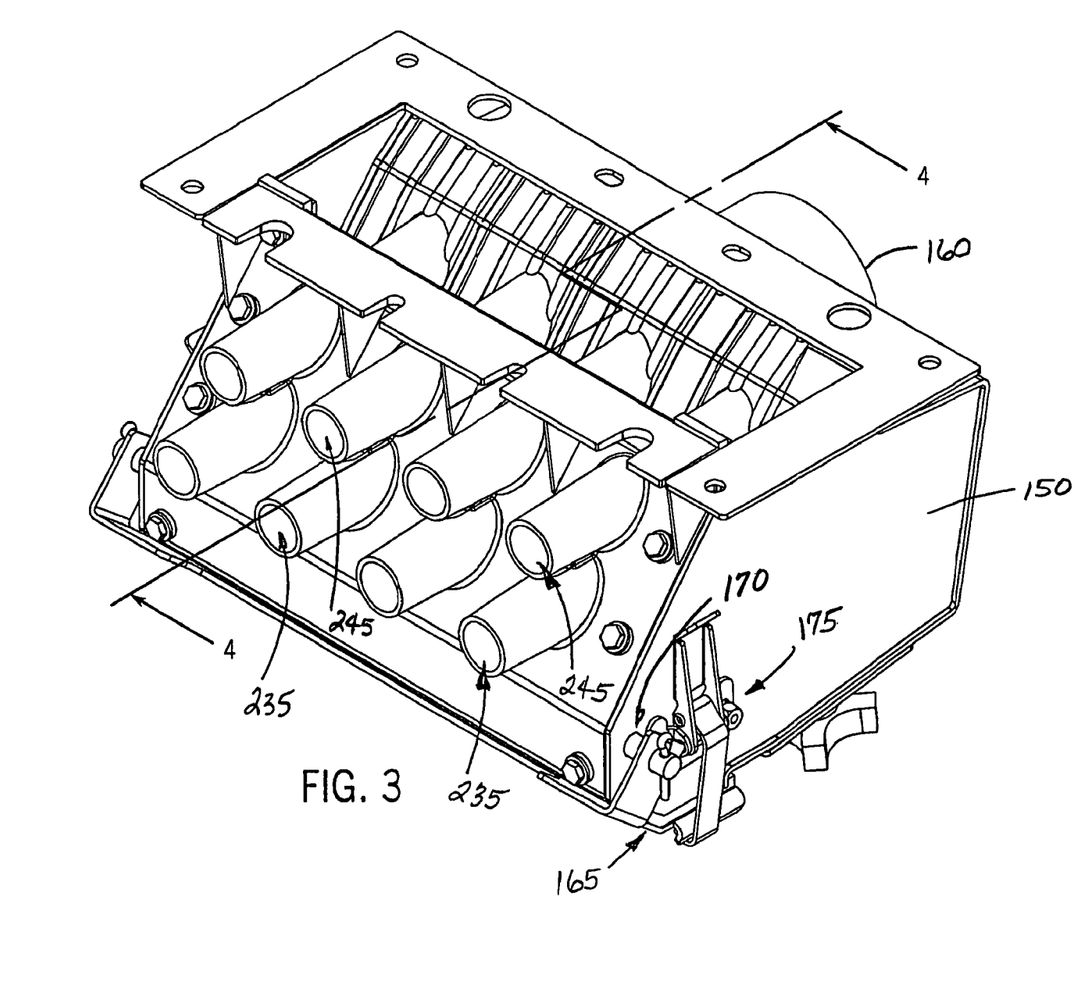
Figure 5:
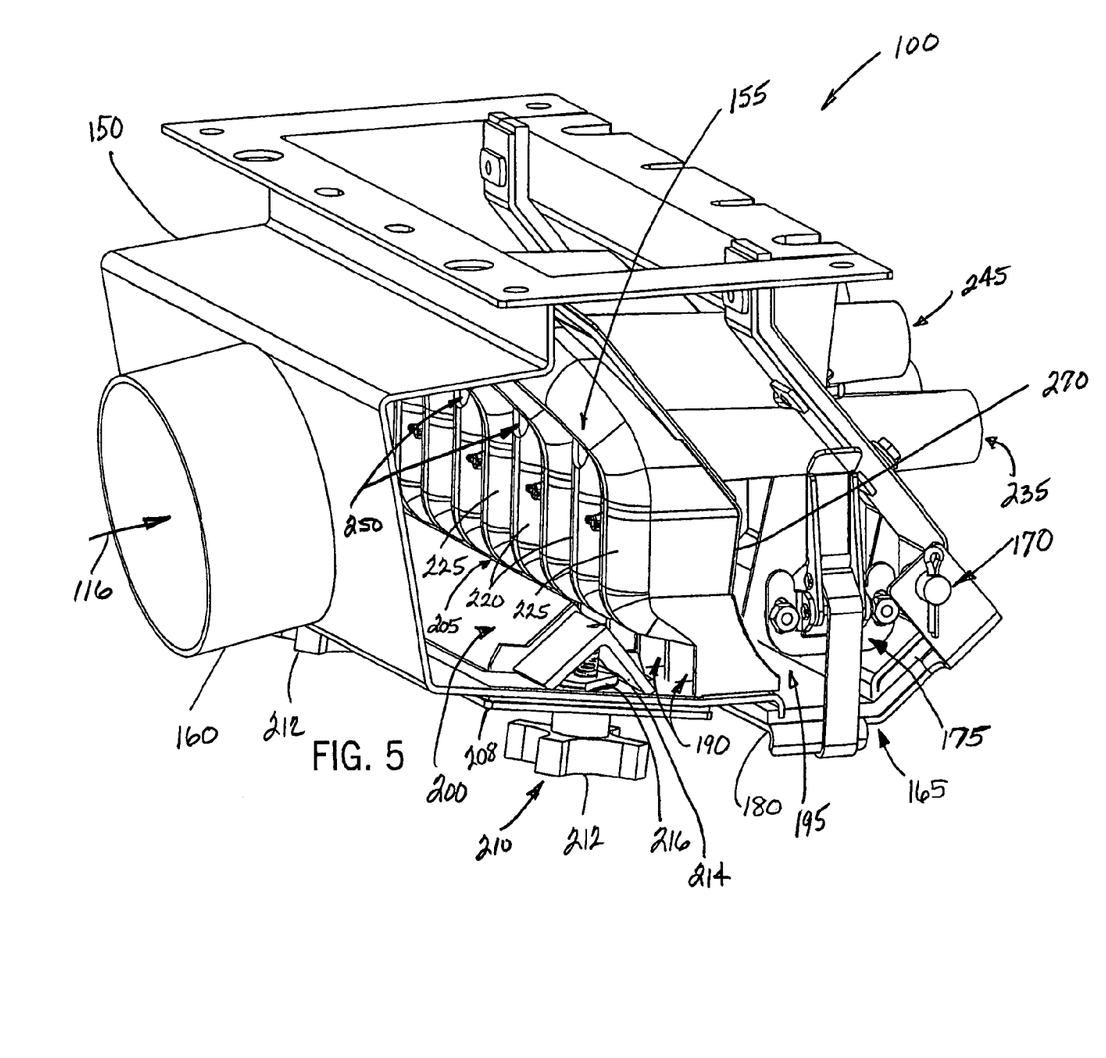
Figure 6:
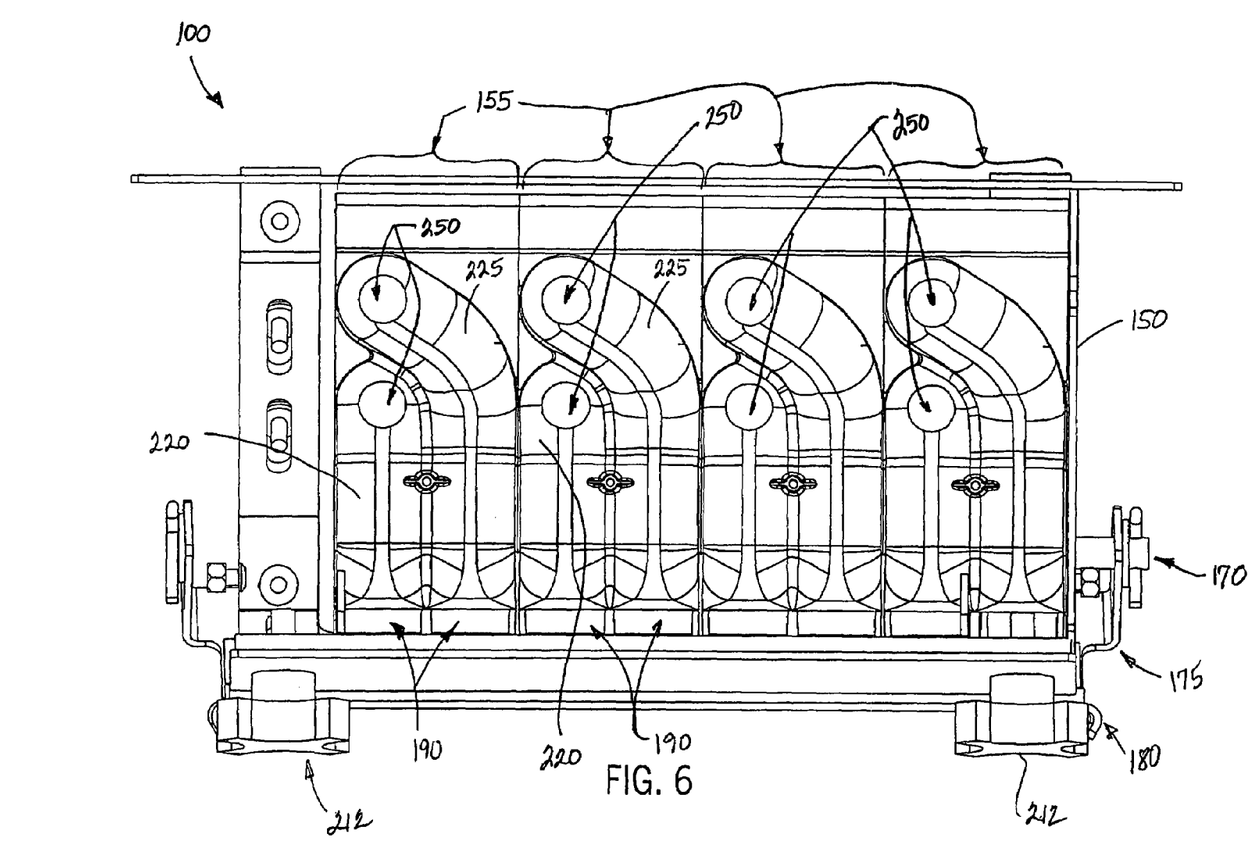

Referring to FIGS. 3–6, the inductor assembly 100 generally includes an inductor housing 150 configured to enclose a series of inductor segments 155. As shown in FIG. 4, the inductor housing 150 is mounted underneath and in flow communication with the storage hopper 110 of the air cart 105. The preferred inductor housing 150 generally includes an inlet 160 to receive the forced air stream 116 from the forced air source 115. As shown in FIGS. 3–5, an access door 165 is pivotally coupled to allow access to the interior of the inductor housing 150, as well as to empty the contents of the inductor housing 150. FIGS. 3, 5 and 6 show how the access door 165 is pivotally mounted by a pivot pin 170 located at the rearward end of the inductor housing 150. A low profile latch mechanism 175 is provided to selectively secure the access door 165 in a closed position against the inductor housing 150. In securing the access door 165 in the closed position the latch mechanism 175 is configured to engage a U-shaped structure 180 mounted on the access door 165.

As illustrated in FIGS. 4–6, the series of inductor segments 155 are located side-by-side along a lateral width of the inductor housing 150. Each inductor segment 155 in combination with the housing 150 defines a nozzle region 190 that directs the forced air stream along a flow path that tangentially engages the pile of product P supplied from the hopper 110 at the rearward end 195 of the series of inductor segments 155, relative to the forward direction of travel 102.

Referring to FIGS. 4 and 5, the forced air stream 116 received at the inlet 160 of the inductor assembly 100 is spread across the entire series inductor segments 155. The nozzle regions 190 defined by the inductor segments 155 generally split the air stream 116 at the general location where the product is delivered from the storage hopper 110 of the air cart 105 to the inductor assembly 100. A vane 200 is located forward of the nozzle regions 190 of the inductor segments 155 and positioned at an angle with respect to horizontal. The vane 200 generally enhances the smooth transition of the flow path of the forced air stream from the inductor inlet 160 toward the pile of product P that enhances the air to product ratio, and thereby enhances the efficiency of the forced air stream in suspending the product in the forced air stream. The vane 200 is configured to enhance the smooth transition of the flow path of the forced air stream from the inductor inlet 160 toward the pile of product P that enhances the air to product ratio, and thereby enhances the efficiency of the forced air stream in suspending the product in the forced air stream.

Still referring to FIGS. 4 and 5, the preferred vane 200 is generally a ramp structure positioned with respect to the inductor segment 155 to define a gap 205 of about one-eighth inch (±one-quarter inch) therebetween. The housing 150 includes a generally rectangular-shaped opening 206 to receive the vane 200. The vane 200 is attached (e.g., welded) to a removable hatch panel 208 fastened to the underside of the housing 150 by a fastener 210. The preferred fastener 210 includes a knob 212 having a threaded bolt 214 configured to insert in a nut 216 attached (e.g., welded) at the inductor housing 150, thereby allowing ready fastening of the hatch panel 208 with the inductor housing 150. A seal 218 around the hatch panel 208 prevents escapes of the forced air stream and the escape of product. The hatch panel 208 can further include one or more ears 219 configured to locate the vane 200 at the desired position relative to the inductor segments 155. Although the vane 200 is illustrated in a fixedly position relative to the inductor segments 155 of the inductor assembly 100, the vane 200 can alternatively be connected to a lever (not shown) so as to allow adjustment of the position of the vane 200, and thereby selectively adjust the associated flow path and open area defined by the position of the vane 200.

Referring now to FIGS. 4–6, each inductor segment 155 generally includes a first product tube 220 and a second product tube 225. The first product tube 220 includes a first inlet 230 and a first outlet 235, and the second product tube 225 includes a second inlet (not shown) and a second outlet 245. The outlets 235 and 245 of the first and second product tubes 220 and 225, respectively, are connected in flow communication with distribution lines that lead to associated receiver headers 125 and receivers 135 (see FIG. 2). The first and second product tubes 220 and 225 of each inductor segment 155 thereby split the air and entrained product flow to different receivers 135 associated with the respective distribution lines 120 connected to the first and second product tubes 220 and 225. The first and second product tubes 220 and 225 thus prevent a crossover of the combined stream of forced air and entrained product between the different distribution lines 120 and associated receivers 135. The split or division of the combined stream of forced air and product by each inductor assembly 155 enhances operation of the receivers 135 because each distribution line 120 is operable to run at different times, depending on demand as represented by the level of the product amassed at the associated receiver 135. The forced air stream is split in accordance to the demand of the respective receivers 135, as the forced stream of air tends to go to the inductor segments 155 and associated distribution lines 120 in communication with receivers 135 having a lower airflow resistance.

As illustrated in FIG. 4, a cross-sectional area of each of the first and second product tubes 220 and 225, respectively, is greater relative to a cross-sectional area of the associated distribution lines 120. Thereby, the velocity of the combined stream of forced air and product increases upon entering the distribution line 120 above the minimum carrying velocity of the product so as maintain suspension of the product in the forced air stream through the distribution line 120 to the receiver 135 (See FIG. 2).

As illustrated in FIGS. 3–6, the first and second product tubes 220 and 225 of each inductor segment 155 direct the air and entrained product stream with relatively small directional changes so as to enhance the efficiency to the forced air source 115. The first product tube 220 and the second product tube 225 of each inductor segment 155 are generally aligned in a modular configuration such that the first inlet 230 of the first product tube 225 is adjacent to the second inlet (not shown) of the second product tube 225, and the outlet 245 of the second product tube 225 stacks on top of the outlet 235 of the first product tube 220. The vertical nature of this modular design of each inductor segment 155 enhances the compactness of the inductor assembly 100. This modular design configuration also allows the inductor assembly 100 to be readily adapted to different widths and numbers associated with the number of distribution lines 120 and/or receivers 135. The first and second outlets 235 and 245 and respective distribution lines 120 attached thereto are stacked in generally vertical pairs that optimize space beneath the air cart 105.

Field analyses have shown that when the receiver 135 is filled, a small flow of the forced air stream is still allowed to pass through the mass of product and escape (via a vent that is not shown) at the receiver 135 (See FIG. 2). Thus, a small forced air stream is still capable of flowing through the associated distribution line 120. However, this small flow of the forced stream typically travels at velocity that is below the carrying capacity of the product. If the product were to be allowed to be induced into the distribution lines 120 with the forced air stream at less than the carrying velocity of the product, problematic blocking of the distribution lines 120 is more likely to occur. In particular, smaller-grain product (e.g., sorghum) can be suspended at lower forced air stream velocities, increasing problematic plugging opportunities in the inductor assembly 155 and distribution lines 120 (See FIG. 1).

To reduce these opportunities for problematic plugging, each of the first and second product tubes 220 and 225 of each inductor segment 155 includes bypass opening 250, as illustrated in FIGS. 4–6. Each bypass opening 250 is located in generally concentric alignment with the associated outlet 235, 245 of the product tube 220, 225, respectively. The preferred bypass opening 250 is preferably about three-quarter inch in diameter (±one-half inch). The bypass openings 250 provide a path of least resistance for the forced air stream to bypass the pile of product P delivered at the rearward end 195 of the inductor segments 155. As shown in FIG. 4, a bypass portion (illustrated by arrows 255 and 260) of the total forced air stream 116 thus passes through the bypass openings 250 to the associated distribution lines 120, leaving a remaining portion (illustrated by arrow 265) of the total forced air stream 116 to makes its way through to the pile of product P. These bypass portions 255, 260 of the forced air stream 116 increases the ratio of air to product of the combined stream of forced air and product (illustrated by arrow 118) passing through to the distribution lines 120. This increased ratio of forced air to product also enhances a more uniform stream of suspended product to the receiver 135.

The bypass openings 250 in the first and second product tubes 220 and 225 remove the need for a control gate (not shown) associated with known inductor assemblies. The control gate is undesired because it otherwise obstructs the delivery of the product from the storage hopper 110, as well as inhibits the efficiency of the forced air stream in suspending the product and conveying the product to the product tubes of the inductor segment. Moreover, the control gate of known inductor assemblies required the sidewall defining the inlet of the inductor segments to be concave-shaped to receive the control gate. However, this concave-cave shaped sidewall has a drawback. Field test indicated that this concave-shaped sidewall tended to cause bridging of product in a critical transition area between the pile of product P and the inlets of each of the product tubes 220 and 225 of each of the inductor segments 155.

Referring to FIGS. 4 and 5, without a control gate, a sidewall 270 that defines each inlet 230 of the inductor segment 155 can be extend closer to the adjacent pile of product P delivered from the storage hopper 110 above. The sidewall 270 of each inductor segment 155 is preferably linear or convex shape (e.g., not concave-shaped) so as to promote the flow of the product toward the inlets 230 of the product tubes 220, 225 of each inductor segment 155.

In operation, the inlet 160 of the inductor housing 150 of the inductor assembly 100 receives the forced air stream from the forced air source 115. The vane 200 and the inductor segment 155 define the gap for the forced air stream to the nozzle regions 190 defined underneath the inductor segments 155 with the housing 150. The nozzle regions 190 of the series of inductor segments 155 guide the forced air stream in path toward the pile of product P delivered from the storage hopper 110. The forced air stream strips away product from the pile of product P into suspension in the forced air stream, and the storage hopper 110 replenishes product to the created cavity in the pile of product P. The closer to the bottom of the inductor housing 150 that the product P is stripped away, the more quickly the product P is replenished.

If the forced air stream velocity falls below the carrying velocity of the product, any seed particles that had been entrained into the slow flowing air stream fall out of the airflow and are dropped back into the pile of product P. Thus, the seed particles are picked up and carried by the air stream only when the velocity of the forced air stream is above the minimum carry velocity, thereby allowing the forced air stream to flow without transporting any entrained product into the product tubes 220 and 225 of each inductor segment 155. In contrast, known forced air planters do not allow air to enter the seed distribution lines downstream of the inlet of the inductor segments.

The distribution or receiver header 125 splits the combined stream of air and product among multiple receivers 135. As an alternate configuration, the combined stream of air and product may be sent directly to the receivers without being split. The receivers 135 are designed to separate the product the forced air stream and product and allow the forced air to readily escape when the level of product is below a predetermined vent level, and limits the amount of the forced air stream to escape when the product level is above the predetermined vent level. The more steady that a rate of the product is induced into the forced air stream, the more reduction in plugging opportunities in the distribution lines 120 and the greater the efficiency of the forced air source 115.

The embodiment of the inductor assembly 100 described above is described in combination with the standard air cart 105 having the hopper 110 and the pressurized air source 115. Although the above-description referred to the inductor assembly 100 combined with an air cart 105, it is understood that the inductor assembly 100 of the present invention is adaptable for use with a stand-alone blower and product storage tank or vessel, as well as adapted for incorporating with other types of agricultural implements. Furthermore, the above-described embodiment of the inductor assembly 100 of the invention can be constructed integrally with an air cart 105, or as a modular unit that can be coupled to a standard air cart structure to convert the air cart 105 into a inductor-type of planter.

Furthermore, one skilled in the art will recognize that the present invention can be used to convey numerous types of products (e.g., seed, fertilizer, herbicides, pesticides, etc.) that exhibit suitable properties for forced air conveyance. Furthermore, the typical air cart 105 can be provided with multiple hoppers containing different types of products for application in an agricultural environment. For example, one hopper could have seed product stored therein, while another tank would have fertilizer and yet another tank could have herbicides or still another reservoir of fertilizer. In such multi-tank configurations, one of the tanks could be provided with the inductor assembly 100 to convey seed product to the planting devices, while another inductor assembly 100 is used to control the flow of fertilizer or other product to the planting devices. Thereby, the forced air source 115 on the air cart 105 can be used for both fertilizing and seed planting operations simultaneously. Furthermore, the combined air cart 105 and inductor assembly 100 can be used to apply the fertilizer or other product at a variable rate as controlled by an electronic controller, as is known for precision farming techniques. Other alternative configurations can include one inductor assembly 100 operable to convey seed product to all the receivers 135 (e.g., singulator), as well as multiple inductor assemblies 100 operable to convey seed product to any one particular receiver 135.

Many changes and modifications could be made to the invention without departing from the spirit thereof. The scope of these changes will become apparent from the appended claims.

We claim:

1. An inductor assembly of a product conveyance system, the product conveyance system including a storage hopper for a product and a forced fluid source operable to provide a forced fluid stream, the inductor assembly comprising:

an inductor housing configured to receive a flow of product from the storage hopper, the housing including an inlet configured to direct the forced fluid stream in a direction toward the flow of product so as to generate a combined stream of forced fluid and product; and at least one inductor segment that defines a first conduit and a second conduit, the first conduit having a first inlet and a first outlet and a first bypass opening located therebetween, the second conduit having a second inlet and a second outlet and a second bypass opening therebetween;

wherein:

the first inlet is located to receive a first portion of the combined stream of forced fluid and product generated in the inductor housing and the first bypass opening located in general alignment to receive a first bypass portion of the forced fluid stream passing through the inlet of the inductor housing; and the second inlet is located to receive a second portion of the combined stream of forced fluid and product generated in the inductor housing and the second bypass opening located in general alignment to receive a second bypass portion of the forced fluid stream passing through the inlet of the inductor housing.

2. The inductor assembly as recited claim 1, wherein the inductor assembly lacks a gate to regulate the flow of the forced and product stream into the the first and second conduits.

3. The inductor assembly as recited in claim 1, further comprising a vane located between the housing inlet and the inductor segment, the vane disposed at an angle to direct the forced fluid stream toward the product delivered from the storage hopper into the inductor housing.

4. An inductor assembly for conveyance of a product in a storage hopper of a planting implement for application in an agricultural field, the planting implement including a forced fluid source operable to provide a forced fluid stream, comprising:

an inductor housing configured to receive the flow of product from the storage hopper, the housing including an inlet configured to direct the forced fluid stream in a direction toward the flow of product so as to generate the combined stream of forced fluid and product;

at least one inductor segment that defines at least one conduit in flow communication to receive the combined stream of forced fluid and product generated in the inductor housing; and a vane located between the inductor housing inlet and the at least one inductor segment, the vane disposed at an angle to direct the forced fluid stream toward the product received from the storage hopper into the inductor housing and being attached to a removable panel.

5. The inductor assembly as recited claim 4, wherein the vane defines a gap with the at least inductor segment to direct the forced fluid stream through.

6. A product conveyance system configured for application of a product in an agricultural environment, comprising:

a hopper configured to contain a supply of the product;

a forced fluid source operable to provide a forced fluid stream;

a planting unit configured to apply the product in the agricultural environment; and an inductor assembly configured to provide a combined stream of forced fluid and product to the planting unit, the inductor assembly including:

an inductor housing configured to receive the product from the storage hopper, the inductor housing including an inlet configured to direct the forced fluid stream in a direction toward the product delivered from the storage hopper so as to generate the combined stream of forced fluid and product; and at least one inductor segment that defines a first conduit and a second conduit, the first conduit having a first inlet and a first outlet and a first bypass opening located therebetween, the second conduit having a second inlet and a second outlet and a second bypass opening therebetween wherein:

the first inlet is located to receive a first portion of the combined stream of forced fluid and product generated in the inductor housing and the first bypass opening located in general alignment to receive a first bypass portion of the forced fluid stream passing through the inlet of the inductor housing; and the second inlet is located to receive a second portion of the combined stream of forced fluid and product generated in the inductor housing and the second bypass opening located in general alignment to receive a second bypass portion of the forced fluid stream passing through the inlet of the inductor housing.

7. The product conveyance system as recited in claim 6, wherein the at least one inductor segment includes a plurality of vertical walls that define one or more nozzle regions underneath the inlets of the first and second conduits of the at least one inductor segment, and further including:

a vane located between the inductor housing inlet and the one or more nozzle regions defined by the at least one inductor segment, the vane disposed at an angle to direct the forced fluid stream toward the product delivered from the storage hopper into the inductor housing.

8. The product conveyance system as recited in claim 6, further comprising a vane located between the inductor housing inlet and the inlet of the at least one conduit of the at least one inductor segment, the vane disposed at an angle to direct the forced fluid stream toward the product received from the storage hopper.

9. A method of conveying a product using a stream of forced air to a remote location, the method comprising the acts of:

receiving a forced air stream into an inlet of an inductor housing;

guiding a first portion of the forced air stream in a path to engage a mass of product in the inductor housing in such a manner as to generate a combined stream of product and forced air;

receiving a first portion of the combined stream of forced air and product into an inlet of a first inductor segment disposed inside the inductor housing;

receiving a second portion of the forced air stream into the first inductor segment at a location downstream of the inlet of the first inductor segment;

combining the second portion of the forced air stream with the first portion of the combined stream of product and forced air for discharge from an outlet of the first inductor segment;

receiving a second portion of the combined stream of forced air and product in an inlet of a second inductor segment disposed inside the inductor housing;

receiving a third portion of the forced air stream into the second inductor segment at a location downstream of the inlet of the second inductor stream; and combining the third portion of the forced air stream with the second portion of the combined stream of product and forced air for discharge from an outlet of the second inductor segment.

10. The method as recited in claim 9, wherein the receiving step includes conveying the second portion of the forced air stream through a bypass opening located between the inlet and the outlet of the first inductor segment.

11. The method as recited in claim 9, wherein the guiding step includes funneling the forced air stream between a vane and the inductor segment.

12. An inductor assembly of a product conveyance system, the product conveyance system including a storage hopper for a product and a forced fluid source operable to provide a forced fluid stream, the inductor assembly comprising:

an inductor housing configured to receive a flow of product from the storage hopper, the housing including an inlet configured to direct the forced fluid stream in a direction toward the flow of product so as to generate a combined stream of forced fluid and product; and at least one inductor segment that defines at least one conduit having an inlet and an outlet the inlet located to receive the combined stream of forced fluid and product generated in the inductor housing, the at least one inductor segment further including a bypass opening disposed between the inlet and the outlet of the at least one conduit, the bypass opening located in general alignment to receive a bypass portion of the forced fluid stream passing through the inlet of the inductor housing;

wherein:

the at least one inductor segment each defines a first conduit and a second conduit, the first conduit having a first inlet and a first outlet and a first bypass opening located therebetween, the second conduit having a second inlet and a second outlet and a second bypass opening therebetween;

the second outlet of the second conduit is stacked above the first conduit, and wherein the second bypass opening of the second conduit is generally stacked above the first bypass opening of the first conduit.

13. An inductor assembly of a product conveyance system, the product conveyance system including a storage hopper for a product and a forced fluid source operable to provide a forced fluid stream, the inductor assembly comprising:

an inductor housing configured to receive a flow of product from the storage hopper, the housing including an inlet configured to direct the forced fluid stream in a direction toward the flow of product so as to generate a combined stream of forced fluid and product; and at least one inductor segment that defines at least one conduit having an inlet and an outlet the inlet located to receive the combined stream of forced fluid and product generated in the inductor housing, the at least one inductor segment further including a bypass opening disposed between the inlet and the outlet of the at least one conduit, the bypass opening located in general alignment to receive a bypass portion of the forced fluid stream passing through the inlet of the inductor housing;

wherein:

the at least one inductor segment each defines a first conduit and a second conduit, the first conduit having a first inlet and a first outlet and a first bypass opening located therebetween, the second conduit having a second inlet and a second outlet and a second bypass opening therebetween; and the first bypass opening is in general horizontal alignment with the first outlet of the first conduit.

14. A product conveyance system configured for application of a product in an agricultural environment, comprising:

a hopper configured to contain a supply of the product;

a forced fluid source operable to provide a forced fluid stream;

a planting unit configured to apply the product in the agricultural environment;

an inductor assembly configured to provide a combined stream of forced fluid and product to the planting unit, the inductor assembly including:

an inductor housing configured to receive the product from the storage hopper, the inductor housing including an inlet configured to direct the forced fluid stream in a direction toward the product delivered from the storage hopper so as to generate the combined stream of forced fluid and product; and at least one inductor segment that each defines at least one conduit having an inlet and an outlet and includes a plurality of vertical walls that define one or more nozzle regions underneath the inlet of the at least one conduit of the at least one inductor segment, the inlet of the conduit located in flow communication to receive the combined stream of forced fluid and product from the inductor chamber, the at least one conduit further including a bypass opening disposed between the inlet and the outlet and located in general alignment to receive a portion of the forced fluid stream through the inductor housing inlet;

a vane located between the inductor housing inlet and the one or more nozzle regions defined by the at least one inductor segment, the vane disposed at an angle to direct the forced fluid stream toward the product delivered from the storage hopper into the inductor housing;

wherein:

the inductor housing includes a bottom panel; and the vane is attached to the bottom panel of the inductor housing.

15. A product conveyance system configured for application of a product in an agricultural environment, comprising:

a hopper configured to contain a supply of the product;

a forced fluid source operable to provide a forced fluid stream;

a planting unit configured to apply the product in the agricultural environment; and an inductor assembly configured to provide a combined stream of forced fluid and product to the planting unit, the inductor assembly including:

an inductor housing configured to receive the product from the storage hopper, the inductor housing including an inlet configured to direct the forced fluid stream in a direction toward the product delivered from the storage hopper so as to generate the combined stream of forced fluid and product; and at least one inductor segment that each defines at least one conduit having an inlet and an outlet, the inlet of the conduit located in flow communication to receive the combined stream of forced fluid and product from the inductor chamber, the at least one conduit further including a bypass opening disposed between the inlet and the outlet and located in general alignment to receive a portion of the forced fluid stream through the inductor housing inlet;

wherein:

each inductor segment includes a first bypass opening in a first conduit and a second bypass opening in a second conduit generally stacked above the first bypass opening of the first conduit.

16. The product conveyance system as recited in claim 15, wherein the first bypass opening is in general horizontal alignment with the first outlet of the first conduit.

17. The product conveyance system as recited in claim 15, wherein the second bypass opening is in general horizontal alignment with the second outlet of the second conduit.

* * * * *